Feb. 24, 1931.   R. B. LEWIS   1,794,187
GEAR SHIFT MECHANISM
Filed Feb. 5, 1930   3 Sheets-Sheet 1

INVENTOR.
*Robert B. Lewis,*
BY
*Robert M. Barr.*
ATTORNEY.

Feb. 24, 1931.　　　R. B. LEWIS　　　1,794,187
GEAR SHIFT MECHANISM
Filed Feb. 5, 1930　　3 Sheets-Sheet 2

INVENTOR
Robert B. Lewis,
BY
Robert M. Barr.
ATTORNEY

Feb. 24, 1931. R. B. LEWIS 1,794,187
GEAR SHIFT MECHANISM
Filed Feb. 5, 1930 3 Sheets-Sheet 3
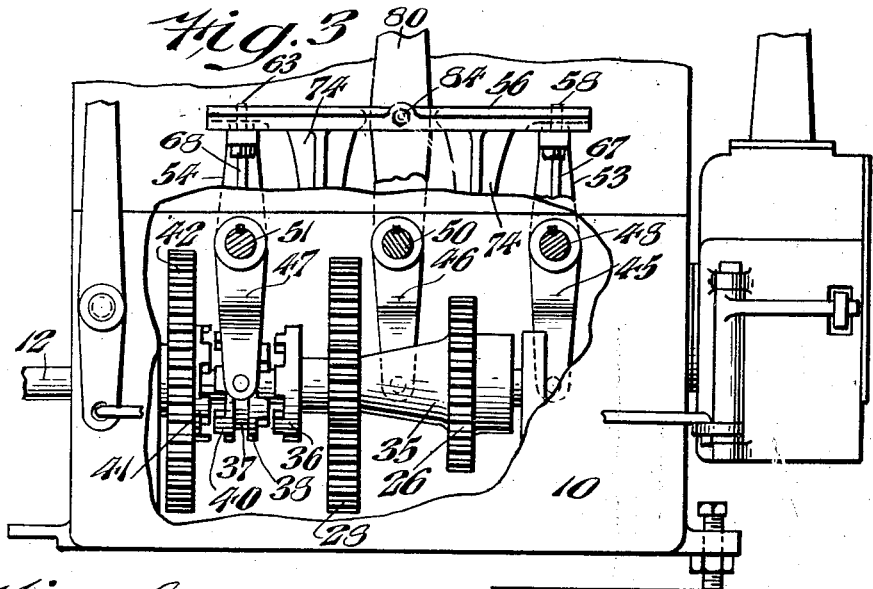
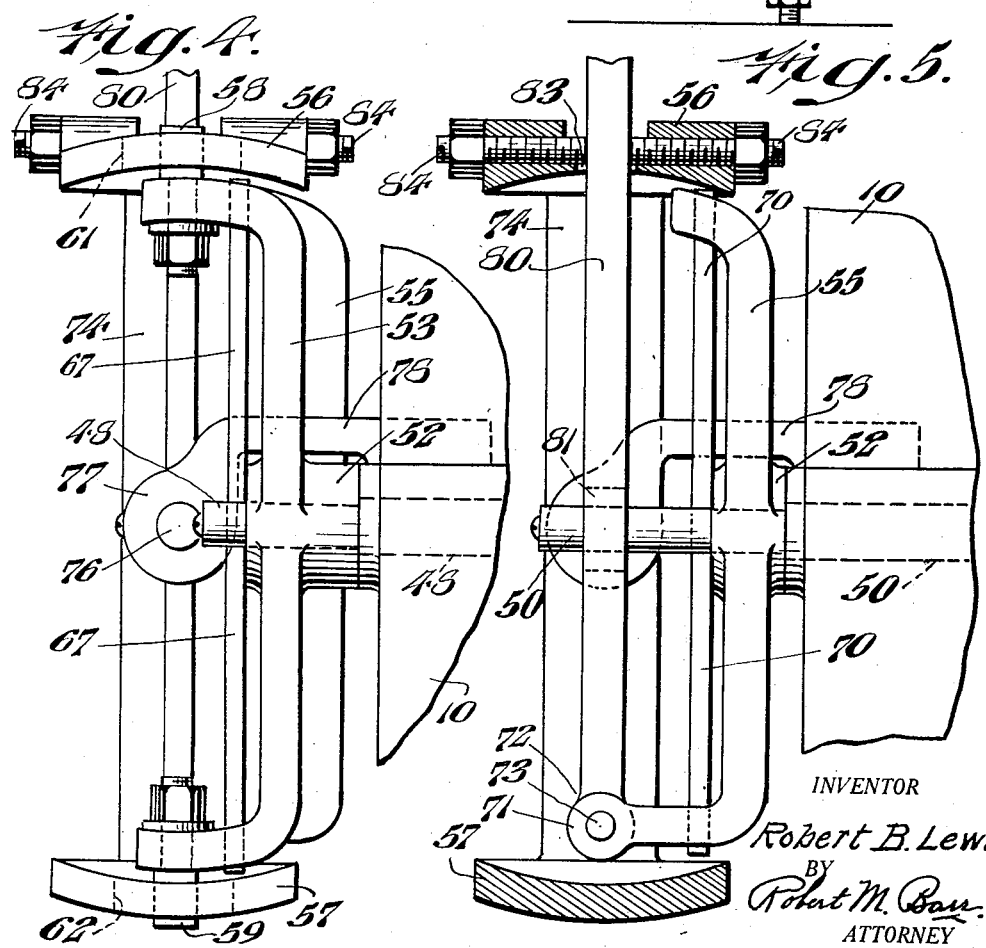
INVENTOR
Robert B. Lewis
BY
Robert M. Barr
ATTORNEY Patented Feb. 24, 1931

1,794,187

UNITED STATES PATENT OFFICE

ROBERT B. LEWIS, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA

GEAR-SHIFT MECHANISM

Application filed February 5, 1930. Serial No. 426,023.

The present invention relates to variable speed mechanism and more particularly to an improved selector shifting unit for controlling a multiple speed system.

Some of the objects of the present invention are to provide a simple and efficient speed selecting device for a multiple speed power transmission; to provide a speed selecting device operated by a single shift lever wherein any one of a plurality of power transmitting speeds can be selected at will; to provide a control for a transmission mechanism wherein eight different speeds are possible so that any one of said speeds can be quickly and easily selected at will; to provide a speed selector mechanism wherein a single control lever co-acts with a movable selector unit for causing any one of a plurality of variable speed mechanisms to be set in accordance with the selected position of said unit as determined by the operation of said shifting lever; to provide a selecting mechanism for a multiple speed transmission wherein the selected driven speed gears are automatically thrown into mesh with the driving gears when the said gears are out of registering position at the time the selecting mechanism is operated; to provide means for imparting to a lever operated clutch combination angular movements which will cause either negative or positive rotation of such levers as are selected for the accomplishment of a predetermined combination of all the levers under the control of a single lever; and to provide other improvements as will hereinafter appear.

Figure 1:
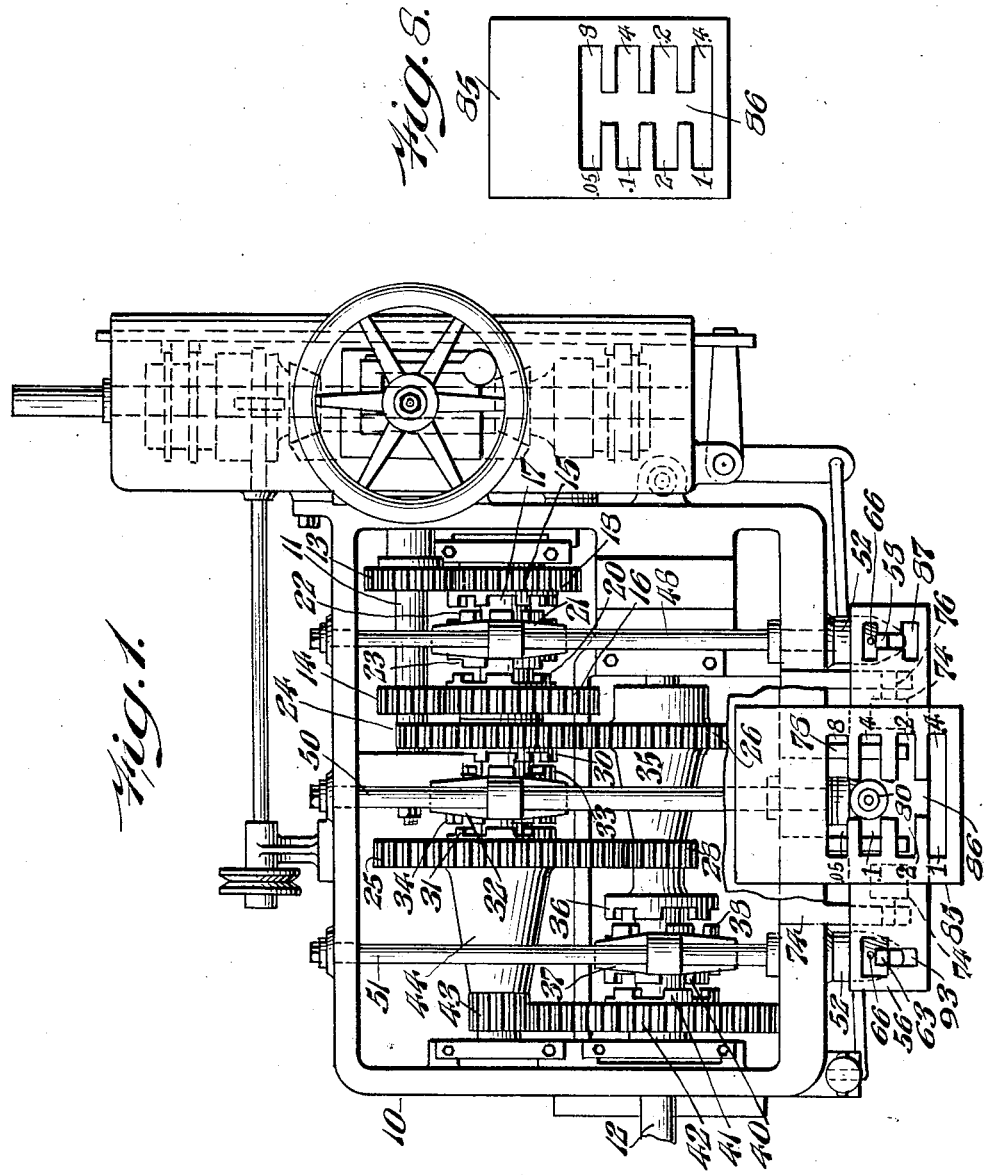
Figure 2:
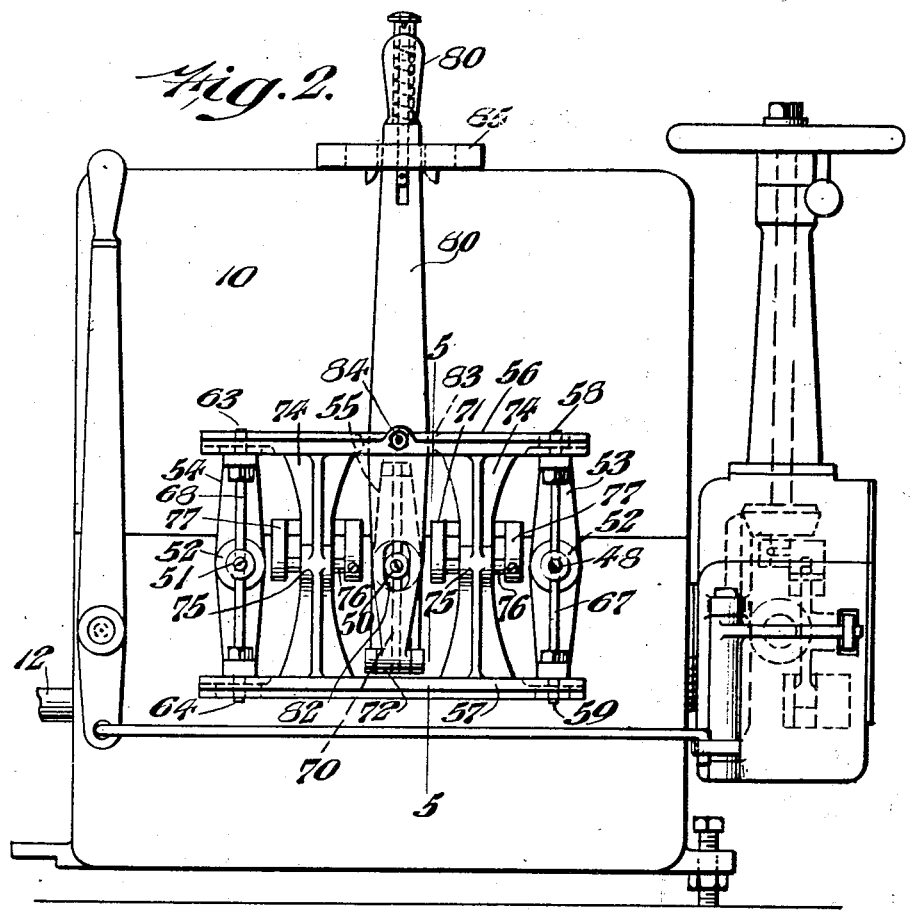
Figure 6:
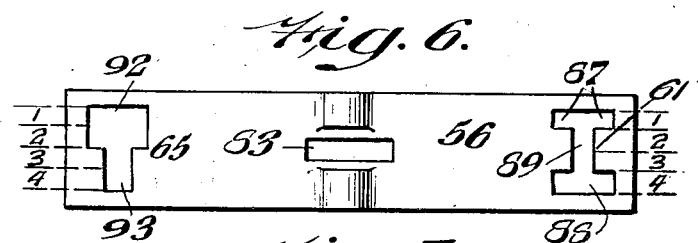
Figure 7:
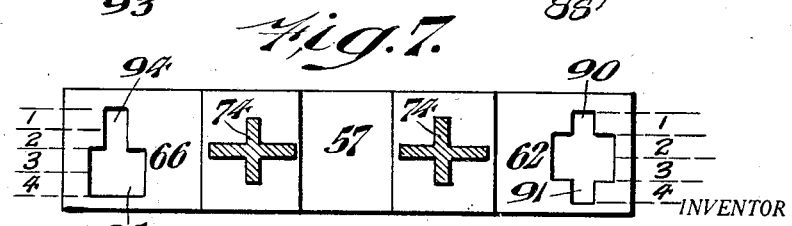

In the accompanying drawings Fig. 1 represents a plan of a multiple speed transmission equipped with a selecting mechanism embodying one form of the present invention; Fig. 2 represents a side elevation of the same; Fig. 3 represents a detail in side elevation with parts broken away to show the clutch shifting means; Fig. 4 represents an enlarged detail in end elevation of the selector unit; Fig. 5 represents a section on line 5—5 of Fig. 2; Fig. 6 represents a plan of the top member of the selector unit; Fig. 7 represents a bottom plan of the bottom member of the selector unit and Fig. 8 represents a detail in plan of the speed selecting plate.

Referring to the drawings and initially to Fig. 1 a multiple speed gear box 10 is shown as an example of a transmission to which the selector mechanism of the present invention can be applied for control purposes. In the present instance this transmission 10 is arranged to transmit eight different speeds from the driving shaft 11 to the driven shaft 12, the selection of the desired speed being made as will presently be explained. The driving shaft 11 carries a high speed gear 13 and a low speed gear 14, both fixed to rotate with the shaft 11, and respectively in mesh with gears 15 and 16 which are supported by a counter-shaft 17 but are rotatable relative to such shaft 17. The opposed faces of these gears 15 and 16 are provided respectively with clutch parts 18 and 20, and the spacing of the gears is such as to receive a clutch member 21 having clutch faces 22 and 23 respectively disposed opposite the parts 18 and 20. The member 21 is keyed to the counter-shaft 17 for sliding movement axially thereof so that if moved one way the clutch parts 18 and 22 will engage and if moved the other way the clutch parts 20 and 23 will engage. The counter-shaft 17 also carries two gears 24 and 25 of different diameters to transmit different speeds and these are loosely mounted to rotate upon the counter-shaft but normally mesh with gears 26 and 28 upon the driven shaft 12. The clutch construction is similar to that heretofore described comprising clutch parts 30 and 31 upon the gears 24 and 25 and a slidable clutch member 32 having clutch faces 33 and 34 for respectively engaging the gear clutch parts 30 and 31. The two gears 26 and 28 are mounted upon a sleeve 35 which is freely rotatable relative to the shaft 12 and terminates at one end in a clutch face 36 juxtaposed with respect to a movable clutch member 37 keyed for sliding movement upon the shaft 12 and having a clutch face 38 for engaging the face 36. Another clutch face 40 is provided upon the other side of the member 37 for engagement with a clutch face 41 upon a gear 42 which is freely rotatable upon the shaft 12 and in mesh with a gear 43 fast to the sleeve 44 which carries the gear 25.

For the purpose of shifting the respective clutch members 21, 32, and 37 axially to engage the respective selected clutch faces, rocker forks 45, 46 and 47 are attached to the respective members 21, 32 and 37, the fork 45 being keyed to a rocking-shaft 48, the fork 46 being keyed to a rock-shaft 50, and the fork 47 being keyed to a rock-shaft 51. The three rock-shafts are journalled in the gear box 10 in parallel relation and all project at one side thereof for attachment to the selecting mechanism.

For selectively controlling the operation of the rock-shafts 48, 50 and 51, the projecting end of each carries a hub 52 freely rotatable thereon and forming an integral part of a yoke. Thus there are two end yokes 53 and 54 and an intermediate yoke 55, which are mounted to normally maintain a vertical position between the top and bottom plates 56 and 57 of a selector unit. The yoke 53 is provided with two oppositely located and outwardly disposed radial pins 58 and 59, which are respectively fixed to the ends of the yoke, the pin 58 riding in a cam hole 61 of the plate 56 and the pin 59 riding in a cam hole 62 of plate 57. Likewise the yoke 54 has similarly mounted pins 63 and 64 riding respectively in cam holes 65 and 66 of the respective plates 56 and 57. The arms of the yoke 53 are interconnected by a rod 67 of spring material which passes through the end of the rock-shaft 48 with a snug fit. The arms of the yoke 54 are also interconnected by a rod 68 of spring material which passes through the end of the rock-shaft 51 with a snug fit. The intermediate yoke 55 has its arms connected by a rod 70 of spring material which passes through the end of the rock-shaft 50 with a snug fit, while its lower arm terminates in a pair of apertured ears 71 receiving between them an apertured head 72 arranged for pivotal movement upon a pivot pin 73.

For supporting the selector unit, the plates 56 and 57, which are segment shaped, are interconnected by transverse webs 74 which extend radially respectively from hubs 75 pivotally mounted upon pins 76. Each pin 76 is fixedly held by a pair of ears 77 forming a part of a bracket 78 fastened to the main frame or box 10 in any suitable manner. In each case the space between one pair of ears is greater than the length of the hub 75 mounted therebetween, and the clearance at both sides of the hub, when the latter is in its middle position, is such as to allow the unit to move in both directions far enough to give the yokes sufficient rocking motion to turn the rock-shafts angularly far enough to clutch or declutch the respective clutches.

For swinging the selector unit about its axis (namely the pins 76) and also for shifting it axially along the pins 76 to bring it to any selected position, a shift lever 80 is provided which is integral with the head 72 and has a hub 81 provided with an elongated slot 82 for the reception of the shaft 50. This lever 80 passes through a centrally disposed opening 83 in the upper plate 56 and contacts therewith at its opposite sides respectively so that any movement of the lever 80 about the shaft 50 as an axis will result in like movement of the selector unit. Adjustable pins 84 enter the plate 56 from opposite sides and are set against the lever 80 to transmit movement thereof to the unit when the lever 80 is swung about the pin 73 as a pivot. This shifting of the pivot from the shaft 50 to the pin 73 allows a relatively small arc of travel of the lever 80 while giving a relatively large arc of travel to the selector unit about the pins 76 as an axis.

The upper end of the lever 80 terminates in a handle operating in a selector plate 85 fixed to the gear box 10 or other part. This plate 85 is provided with a central transverse slot 86 to allow unrestricted swing of the lever 80 about the pivot 73 and communicates at both sides with a plurality of pockets arranged in pairs in opposed relation. These pockets for convenience are designated in terms of speed ratios 1 and .4, 2 and .2, .1 and 4, .05 and 8, and the arrangement is such that the speed determined by the lever 80 when in a pocket at one side bears a definite relation to the speed determined by the lever 80 when in the pocket directly opposite.

In connection with the cam slots of the selector unit it should be noted that the slot 61 in the top plate 56 has a shape complemental to the shape of the slot 62 and similarly the cam slot 65 is complemental to the cam slot 66. That is to say, in the present arrangement one end of the cam slot 62 is elongated as shown at 87 to have a width to receive the pin 58 and a length to allow that pin to follow a complete stroke of the lever 80 in both directions when shifted into the pockets .05 or 8. Similarly the opposite side of the cam slot 61 is provided with a like slot 88 of the same width and length so as to correspond to the movement of the pin 58 when the lever 80 enters the pockets 1 and .4. Thus the slots 87 and 88 correspond respectively to two positions of the lever 80, which are taken by swinging the lever 80 about the pivot 73 to bring the arm opposite to one or the other of the first and fourth position pockets. When the lever 80 is in either of these two positions it can be moved clockwise or anti-clockwise by swinging it about the pivot 55 and consequently four speeds are at the command of the operator. The two slots 87 and 88 are interconnected by a centrally disposed slot 89, the length of which is substantially twice the diameter of the pin 58, while its width is such as to abut both sides of the pin 58. Thus when the lever 80 is opposite either of the two intermediate pockets 1.—4 or 2—.2, the pin 58 will be in the slot 89 so that movement of the plate 56 will be transmitted directly to that pin 58. The cam slot 62 in the plate 57 is so shaped that its pin 59 is moved by the plate 57, only when the pin 58 is in either of the slots 87 or 88 and therefore in position "1" of the lever 80, the pin 59 is seated in a slot 90 corresponding substantially in shape and size to the shape and size of the pin 59, and when in position "4" of the lever 80, the pin 59 seats in a slot 91 also of substantially the same shape and size as the pin 59, and as a result any rocking movement of the lever 80 about the pivot 55, when the pin 59 is in either slot 90 or slot 91 will result in transferring the movement of the selector unit, through plate 57 to the pin 59. During such movement the pin 58 rides freely in either the slot 87 or slot 88 of the cam slot 61 of plate 56 depending upon whether the lever 80 is in position "1" or position "4".

For controlling the movement of the selector unit by the pins 63 and 64, the top plate 56 has its cam slot 65 substantially T-shaped, the head slot 92 of the T having a width corresponding to twice the diameter of the pin 63 (in order to take care of two positions of the lever 80) and a length equal to the full throw of the plate 56 under the action of the lever 80 when swung about the pivot 55. The shank of the T is a slot 93 having a length equal to twice the diameter of the pin 63 and a width substantially that of the pin 63 so that the latter is maintained in abutting relation with the plate 56 to receive motion therefrom without lost motion. The cam slot 66 of the plate 57 is of the same shape and dimensions as the slot 65 but is inverted with respect thereto, so that the T-shank slot 94 is vertically beneath the slot 92, while the T-head slot 95 is opposite to and below the slot 93. The four possible positions of the pins 58, 59, 63 and 64, transversely considered, are indicated by dotted lines opposite the respective slots. In Fig. 1 of the drawings the lever 80 is shown in neutral position opposite position 2 corresponding to registering position with pockets .1 and 4 of the indicator plate 85, and therefore the pin 58 is in position so that horizontal movement of the selector plate 56 will transmit angular movement of the lever 53 in the same direction; the pin 59 is in such a position in the slot 62 that movement of the selector plate 57 in either direction will not engage this pin 59; the pin 63 is in such a position in the slot 92 that the selector plate 56 is free to move in either direction without engaging this pin 63; and the pin 64 is in position so that horizontal movement of the selector plate 57 will transmit angular movement through this pin to the lever 54 and in the same direction. Now if the lever 80 is turned clockwise to enter the pocket "4," the plate 56 will move to the right and carry the pin 59 with it, while the pin 63 receives no motion because the slot 92 allows the plate 56 to move relative to this pin 63. The bottom plate 57 follows the movement of the plate 56 and transmits its motion to the pin 64 in slot 94 while the pin 59 is unaffected because it is in the widest part of the slot 62. Likewise throwing the lever 80 counter-clockwise to enter the pocket .1 will bring about a different selection of the control pins and cause different rocking of the clutch shafts so that another speed can be selected. Thus the lever 80 can be rocked about its pivot 73 to select any one of four positions and in each of which it is capable of being rocked on its pivot 50, clockwise and anti-clockwise, to give a choice of two speeds. In the form of the invention here illustrated a multiple speed transmission is shown having eight different speeds which can be selectively controlled by a single lever selector unit.

The operation of the selecting mechanism is as follows:

Assuming the control lever 80 to be in a neutral position and it is desired to select a certain speed ratio, the lever 80 is moved lengthwise in the slot 86 until it is in register with the slot in the plate 85 which corresponds to the selected speed ratio. This movement of the lever 80 lengthwise of the slot 86 takes place by swinging it about the pivot pin 73 and since the selector unit is pivoted upon the pins 76 it will have a relatively long arc of travel while the arc of travel of the lever 80 is relatively short. This is advantageous in that the operator does not have to move the lever 80 through a long arc of travel to reach the selected position. Assuming the selected speed to be one of those determined by the pocket .1—4 the lever 80 will be swung to the position shown in Fig. 1 where it is in register with these pockets and it can then be moved, for example, clockwise to enter the pocket "4" to select one of the speeds. Since the edge of the lever 80 is in contact with the plate 56 the latter, together with the plate 57, will be shifted to the right as seen in Fig. 2 and the yoke pins which are then in a position to be pushed by these plates will follow the movement of the selector unit. In this instance the pins so picked up by the selector unit are pins 58 and 64 and no pressure is placed upon the pins 59 and 63 because these latter are respectively located in the long slots of the cams 62 and 65 so that the plates 56 and 57 can move relative to these last mentioned pins. The result of this movement to the right of the selector unit causes the yoke 53 to swing the upper half of the rod 67 in a clockwise direction while the yoke 54 swings the lower half of the rod 65 in a counter clockwise direction and the result is the shaft 48 is rocked clockwise while the shaft 51 is rocked counter clockwise provided the clutch members are in register with the gear clutch faces to permit the required rocking action. The clockwise movement of the shaft 48 rocks the movable clutch member 23 into clutching relation with the clutch face 20 upon the gear 16, and the counter clockwise movement of the shaft 51 rocks the movable clutch member 37 into clutching relation with the clutch 36. In case the respective clutch faces of the clutch members 23 and 37 are not in register with the clutch faces of the clutch part to be driven they will contact with such clutch faces, though this will not interfere with the continued movement of the selector unit to its full stroke position because the rods 67 and 68, being of spring or elastic material, will now be in position to maintain the proper directional shifting pressure of the rock shafts. Therefore as soon as the out of register gear clutch faces turn into register these spring rods 67 and 68 will snap the respective shafts in the proper direction to bring about the desired clutching action of the clutches. The middle yoke 55 being attached to the lever 80 through the pivotal connection 73 follows the movement of the lower end of the lever 80 and hence in the foregoing illustration the shifting of the selecting unit to the right will result in a clockwise movement of the shaft 50 to throw the movable clutch member 34 into clutching relation with the clutch face 31 of the gear 25. Thus by the relatively short swing of the lever 80 in one direction followed by a swinging movement about the pivot 50 any one of the eight speeds can be quickly and easily selected at will, while by reason of the spring effect of the positioning rods, clashing of the clutch parts is eliminated and change from one speed to another made relatively noiselessly.

It will now be apparent that a complete unitary selector mechanism for multiple speed transmissions has been devised wherein the shaft of each clutch member of the transmission is controlled by means acting upon it from opposite sides, while each means is capable of controlling more than one direction of movement of the shaft. Furthermore the selecting device is so arranged and constructed as to permit selection of a certain speed ratio of the transmission and it can set that selected speed ratio regardless of the position of the clutching elements at the time the selection is made. In other words, the selection of a speed ratio is made and set whether the clutch parts are in register or not but if the parts are not in register the set position can still be made followed by an automatic clutching action, which takes place when the clutching devices have moved to registering position.

Having thus described my invention, I claim:

1. A selecting mechanism for multiple speed transmissions comprising a plurality of rock shafts respectively arranged to shift the movable elements of a plurality of clutches, separate means at opposite sides of each shaft for rocking each shaft clockwise and anti-clockwise, lever controlled means for selecting one or the other of each set of said rocking means, and means for selecting the direction of operation of the selected means.

2. A selecting mechanism for multiple speed transmissions comprising a plurality of rock shafts respectively arranged to shift the movable elements of a plurality of clutches, separate means at opposite sides of each shaft for rocking each shaft clockwise and anti-clockwise, a selecting device arranged to select one or the other of each set of said rocking means, and a lever movable to any one of a plurality of positions for setting said selecting device in a predetermined position.

3. A selecting mechanism for multiple speed transmissions comprising a plurality of rock shafts respectively arranged to shift the movable elements of a plurality of clutches, separate means at opposite sides of each shaft for rocking each shaft, means including cam elements for selectively operating said rocking means, and means for setting said selecting means for a predetermined rocking of said shafts.

4. A selecting mechanism for multiple speed transmissions comprising a plurality of rock shafts respectively arranged to shift the movable elements of a plurality of clutches, separate means at opposite sides of each shaft for rocking each shaft, a plate having means for selectively operating the means at one side of each shaft, a plate having means for selectively operating the means at the other side of each shaft, and means for setting each plate in a predetermined position to cause a certain directional rocking of each shaft.

5. A selecting mechanism for multiple speed transmissions comprising a plurality of rock shafts respectively arranged to shift the movable elements of a plurality of clutches, separate means including yieldable spring members at opposite sides of each shaft for rocking each shaft, a plate having means for selectively operating the means at one side of each shaft, a plate having means for selectively operating the means at the other side of each shaft, and manually operable means for setting each plate in a predetermined position to cause a certain directional rocking of each shaft.

6. A selecting mechanism for multiple speed transmissions comprising a plurality of rock shafts respectively arranged to shift the movable elements of a plurality of clutches, separate means at opposite sides of each shaft for rocking each shaft, a pivoted unit mounted for sliding movement on its pivot and including means selectively operating said rocking means, and a lever for swinging said unit to a selecting position and for moving said unit to carry out the set selecting operation.

7. A selecting mechanism for multiple speed transmissions comprising a plurality of rock shafts respectively arranged to shift the movable elements of a plurality of clutches, separate means at opposite sides of each shaft for rocking each shaft, a pivoted unit mounted for sliding movement on its pivot, two cam elements on said unit for selecting the rocking means of each shaft, each cam element having two controls for rendering said rocking means effective and two controls for rendering said rocking means ineffective, and a lever for swinging said unit to a selecting position and for moving said unit to carry out the set selecting operation.

8. A selecting mechanism for multiple speed transmissions comprising a plurality of rock shafts respectively arranged to shift the movable elements of a plurality of clutches, separate means at opposite sides of each shaft for rocking each shaft, a pivoted unit mounted for sliding movement on its pivot and including means for selectively operating said rocking means, and a lever pivoted eccentric with respect to the pivot of said unit for swinging said unit to a selecting position, and pivoted to also swing in a different plane for moving said unit to selected position.

9. A selecting mechanism for multiple speed transmissions comprising a plurality of rock shafts arranged respectively to shift the movable elements of a plurality of clutches, rotatably mounted yokes respectively adjacent said shafts, a spring member projecting from opposite sides of each shaft and connected at its ends to the adjacent yoke, a selector unit having cam parts, means on each yoke to be respectively operated by said cam parts, and means to shift the position of said selector unit to bring one or more of said cam parts into operative position to shift one or more of said yokes to cause said shafts to rock in a predetermined direction.

10. A selecting mechanism for multiple speed transmissions comprising a plurality of rock shafts arranged respectively to shift the movable elements of a plurality of clutches, rotatably mounted yokes respectively adjacent said shafts, a spring member projecting from opposite sides of each shaft and connected at its ends to the adjacent yoke, pins projecting from both ends of each yoke, a selector unit having two cam slots for respectively coacting with the pins at one end of said yokes and having two cam slots for respectively coacting with the pins at the other end of said yokes, and means for setting said unit in any one of a plurality of positions to give a predetermined rocking movement to said shafts.

11. A selecting mechanism for multiple speed transmissions comprising a plurality of rock shafts arranged respectively to shift the movable elements of a plurality of clutches, rotatably mounted yokes respectively adjacent said shafts, a spring member projecting from opposite sides of each shaft and connected at its ends to the adjacent yoke, pins projecting from both ends of each yoke, a selector unit having two cam slots for respectively coacting with the pins at one end of said yokes and having two cam slots for respectively coacting with the pins at the other end of said yokes, and means to rock said unit about a pivot and slide said unit on said pivot whereby said unit can be set in any one of a plurality of positions to give a predetermined rocking movement to said shafts.

12. A selecting mechanism for multiple speed transmissions comprising a control unit mounted to swing about an axis and slidable upon said axis, a lever operatively associated with said unit for swinging said unit to a selecting position and for shifting said unit axially, one or more rotatable shafts, rocking members projecting radially from opposite sides of each shaft, and selecting devices carried by said unit for engaging one or more of said rocking members as said unit is shifted from a set position by said lever, whereby a predetermined shaft is actuated.

13. A selecting mechanism for multiple speed transmissions comprising a control unit mounted to swing about an axis and slidable upon said axis, said unit having cam slots of different shape at opposite sides thereof, a lever operatively associated with said unit for swinging said unit to a selecting position and for shifting said unit axially, one or more rotatable shafts, and rocking members projecting radially from opposite sides of each shaft and entering respectively said cam slots whereby a shifting movement of said unit causes operation of one or more of said shafts according to the selected position of said unit.

Signed at Philadelphia, county of Philadelphia, State of Pennsylvania, this 28th day of January, 1930.

ROBERT B. LEWIS.